N. POWER.
AUTOMATIC LOOP SETTER FOR KINETOSCOPE FILMS.
APPLICATION FILED APR. 15, 1912.

1,051,632.

Patented Jan. 28, 1913.
2 SHEETS—SHEET 1.

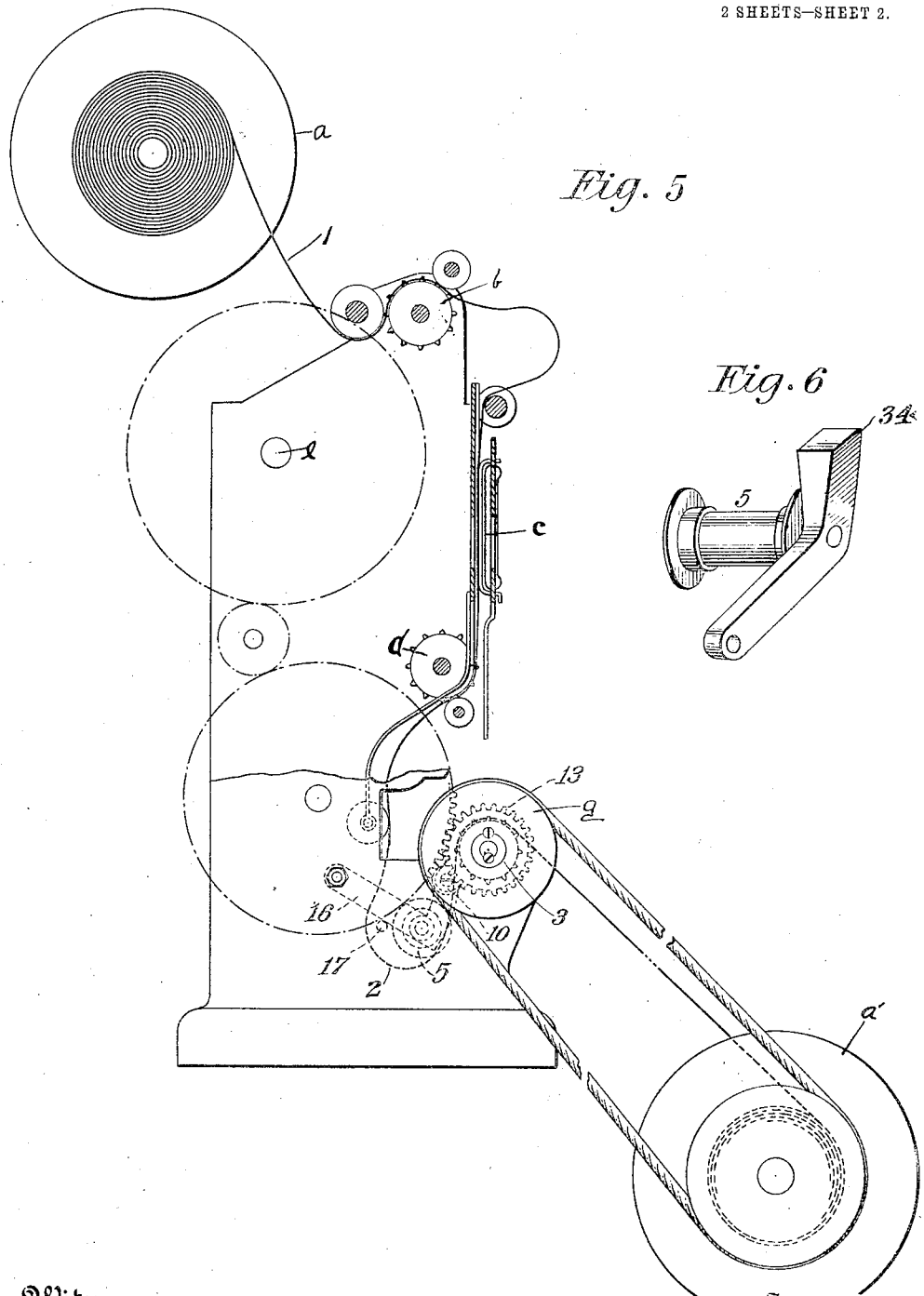

UNITED STATES PATENT OFFICE.

NICHOLAS POWER, OF BROOKLYN, NEW YORK.

AUTOMATIC LOOP-SETTER FOR KINETOSCOPE-FILMS.

1,051,632.  Specification of Letters Patent.  Patented Jan. 28, 1913.

Application filed April 15, 1912. Serial No. 690,899.

*To all whom it may concern:*

Be it known that I, NICHOLAS POWER, a citizen of the United States, residing at Brooklyn, New York, with post-office address at No. 388 Jefferson avenue, have invented an Automatic Loop-Setter for Kinetoscope-Films, of which the following is a specification.

In motion picture machines as at present almost universally constructed the reel of film to be exhibited is placed in a magazine at the top of the machine and is there fed through the projecting apparatus by a feed mechanism comprising a continuously driven sprocket below the magazine and an intermittently driven sprocket below the projection aperture. The teeth of the feed sprockets engage perforations in the margins of the film and the film is threaded in the machine so that the top sprocket maintains a certain amount of slack in the film between the sprockets to prevent undue tension on the film during the operation of the intermittent sprocket. Beneath the intermittent sprocket a second continuously driven sprocket is arranged for controlling the feed of the film to the receiving reel beneath the machine. This reel is driven through a slip gear which maintains a constant tension on the film to secure proper winding, this tension normally coming on the lower continuous sprocket, the film being originally so threaded as to provide a loop between the intermittent sprocket and the lower sprocket. If, however, for any reason the film becomes disengaged from the lower sprocket the reel will take up the loop and this sudden pull coming on the film temporarily held stationary by the intermittent sprocket frequently damages the film before the operator can stop the machine, as well as causing annoying delays in the exhibition while the operator re-sets the film with the proper loop.

The object of the present invention is to provide means for preventing undue tension coming on the film when such slippage occurs and for automatically re-setting the loop in the film, without in any way interfering with the exhibition.

The invention is illustrated as applied to the motion picture machine known as "Power's cameragraph," but it is obvious that the invention may be embodied in kinetoscopes of different makes without material change in the parts or the mode of assembly.

Figure 1:
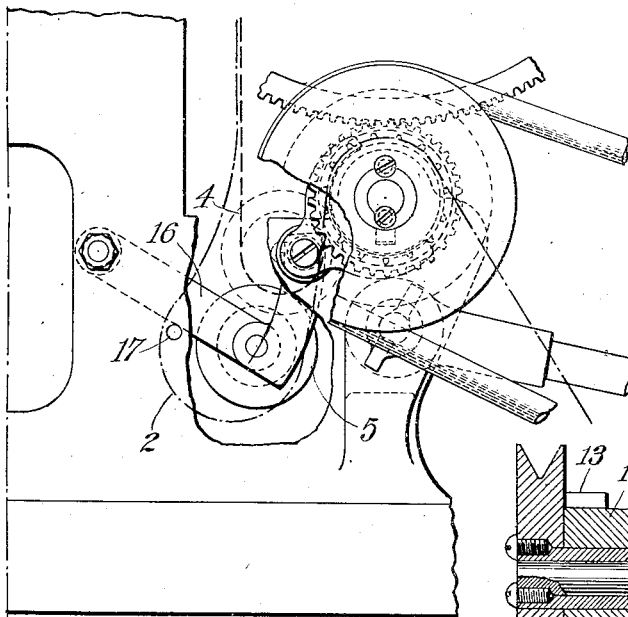
Figure 2:
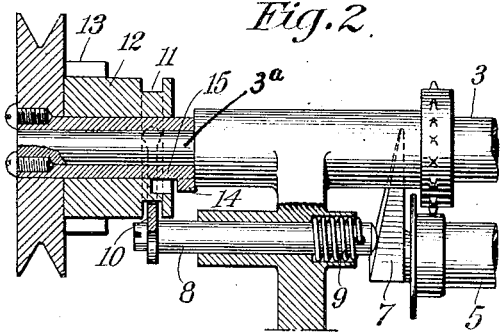
Figure 3:
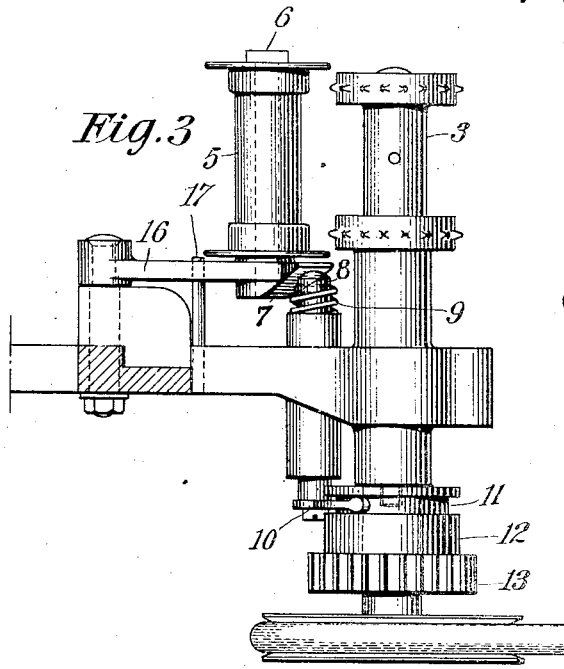
Figure 4:
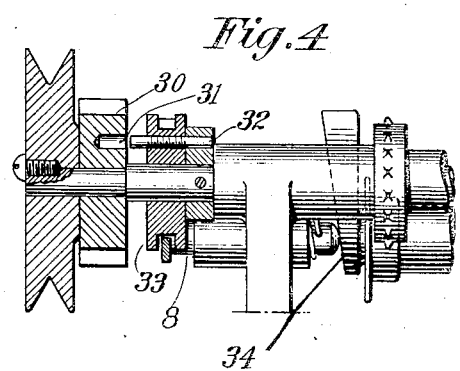

In the drawings: Figure 1 is a view in side elevation of a portion of the machine with the improvement mounted thereon, part of the frame being broken away to show details of construction. Fig. 2 is a view partly in front elevation and partly in longitudinal section of the device shown in Fig. 1. Fig. 3 is a view in plan of the structure shown in Figs. 1 and 2. Fig. 4 is a view partly in elevation and partly in vertical longitudinal section of a modified form of the device. Fig. 5 is a diagrammatic view of a typical machine showing the entire feed mechanism. Fig. 6 is a detail view of a portion of the structure shown in Fig. 4.

Referring now to the drawings and particularly to Fig. 5; 1 designates the film which passes down from the upper reel $a$ over the upper sprocket $b$ thence beneath the guide $c$ adjacent the projection aperture, over the intermittent sprocket $d$. From the sprocket $d$ the film passes downward in a loop 2 and then over the sprocket 3 from which it passes to the lower reel $a'$. The loop 2 is shown in Fig. 5, and also in dot and dash lines in Fig. 1, as of substantially the size in which the said loop will be formed when the machine is running normally.

I have not illustrated in detail the driving mechanism of the upper and intermittent sprockets as the same forms no part of the present invention. It will be understood, however, that they are driven in the usual manner from the driving shaft $e$. The lower sprocket 3 is fast to a shaft $3^a$ rotatably mounted in a suitable bearing beyond which its end projects as shown more particularly in Fig. 2. Attached to this projecting end of the shaft $3^a$ is a sleeve 15 provided with a lug 14 adapted to fit a corresponding recess in the hub 12 of a gear 13 slidingly mounted on the sleeve between the bearing and a pulley wheel $g$ fast to the end of the sleeve. The gear 13 is connected by suitable intermediate gears to the driving shaft $e$ and the pulley wheel

*g* is belted to the driving pulley of the lower reel so that whenever the lug 14 is in engagement with the recess in the gear, the sprocket and reel will be continuously driven. The hub 12 of the gear 13 is provided with a circumferential groove 11 in which engages a fork 10 attached to the end of a rod 8 slidingly mounted in the frame adjacent the bearing of the shaft 3ª and provided with a spring 9 holding the recess in hub 12 in engagement with its lug. Pivoted to the frame to the rear of rod 8 is an arm 16 carrying at its free end a stub-shaft 6 on which is freely mounted a flanged roller 5 overlying the film within the loop 2, a pin 17 being provided to support the arm with the roller 5 just above the bottom of the loop. A wedge-shaped cam 7 is formed on the end of the arm 16 in such position that when the roller 5 is raised, as will be later described, it will shift the rod 8 and disengage the gear 13.

The operation of the mechanism will now be described.

Under normal conditions the film follows the path shown in Fig. 5 and in dot and dash lines in Fig. 1, the pull of the reel maintaining a constant tension on the film beyond the sprocket 3. If now the film becomes disengaged from the sprocket by reason of mutilated driving perforations, or for any other reason, the pull of the reel will take up the loop 2, raising the spool 5 until the film takes the position shown in dotted lines at 4 in Fig. 1. In moving to this position the spool 5 moves the cam 7 across the end of the pin 8 forcing the gear 13 toward the pulley wheel, thereby disengaging the hub from the lug 14 and permitting the reel and sprocket to stop before damage is done to the film. As soon as the reel stops, the tension on the film ceases so that the continued operation of the intermittent sprocket quickly re-forms the loop, permitting the roller 5 to drop and with it the cam 7 so that the spring 9 will again engage the shaft 3ª with the driving gear 13 to drive the sprocket and reel as before. If the perforations in the film do not now engage the sprocket teeth the reel will again draw up the loop, presenting a fresh portion of the film to the sprocket 3, and so on, stopping and re-starting the reel without interfering with the operation of the machine until an unmutilated portion of the film reaches the sprocket 3 and properly engages the same.

In the slightly modified construction shown in Figs. 4 and 6 instead of the sleeve 15 on the end of the shaft 3ª, a collar is fast thereto, which collar is provided with a hole parallel with shaft 3ª for the reception of a pin 32 fast in a collar 33 slidingly mounted on the shaft. The driving pulley for the reel is fast to the end of the shaft as before, and between the pulley and a shoulder on the shaft the driving gear 30 is rotatably mounted but held against axial movement. The pin 32 projects beyond both faces of the collar 33, and the gear 30 is provided with a hole 31 for the reception of the adjacent end of the pin when the collar 33 is shifted toward the gear, the opposite end of the pin being sufficiently long to be always in engagement with the collar fast to the shaft. The collar 33 is engaged by a yoke on the pin 8, similar to the fork 10, and the pin is provided with a spring 9 as described above, but it will be observed that in this construction movement of the collar toward the bearing under the influence of the spring disengages the clutch, hence the operating cam 34 is reversed and normally holds the clutch members in engagement against the tension of the spring, but when the cam is raised it permits the spring to move the collar to disengage the clutch. When the re-forming of the loop permits the roller 5 to drop, the weight of the cam and roller overcomes the tension of the spring and again forces the clutch members into engagement.

Having thus described my invention, what I claim as new and desire to secure by Letters Patent, is:—

1. In a machine for projecting motion pictures, the combination of a plurality of sprockets for feeding a film through the machine, means for operating the sprockets, and means for automatically varying the relative movement of the sprockets to maintain a predetermined slack in the film between the sprockets.

2. In a machine for projecting motion pictures, the combination of an intermittent sprocket and a lower continuously revolving sprocket, a film roller engaging a loop of film between the sprockets and devices associated with said roller for disengaging the driving connections of said lower sprocket when the film is caused to advance rapidly over said sprocket.

3. In a machine for projecting motion pictures, the combination of a film feed comprising an intermittent sprocket, a lower sprocket, means for normally operating said lower sprocket to maintain a certain amount of slack between the sprockets, and means for disengaging the operative means of the lower sprocket whenever the film is suddenly advanced thereon, and for reëngaging said operating means when the lower sprocket has accumulated the initial amount of slack.

4. In a machine of the class described, the combination of an intermittent sprocket, a sprocket beyond the intermittent sprocket, a continuously operating driving mechanism therefor, a clutch between said sprocket and said mechanism, and means for operating said clutch comprising a movable member, adapted to be engaged by the film, said member being normally supported remote from the line of the direct path of movement of the film between said sprockets and adapted to disengage said clutch by movement toward such line.

In testimony whereof, I have signed my name in the presence of witnesses.

NICHOLAS POWER.

Witnesses:
LAWRENCE W. ATWATER,
BAXTER MORTON,
JACOB ORNSTEIN.